Sept. 25, 1951     J. P. KOVACS     2,569,243
FILTER
Filed Dec. 15, 1945     2 Sheets-Sheet 1
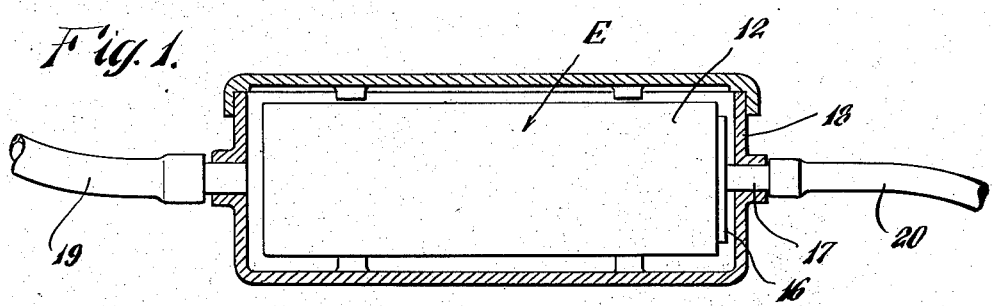
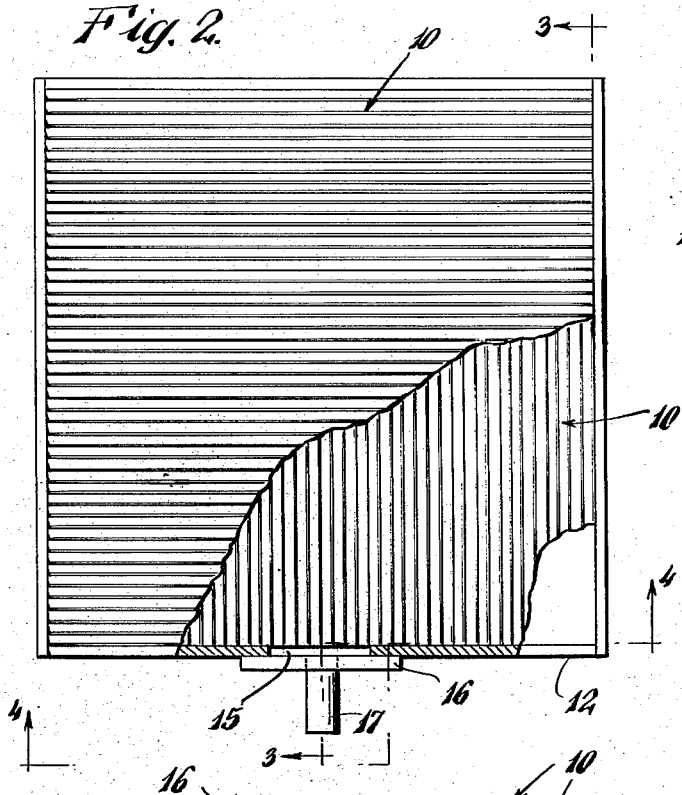
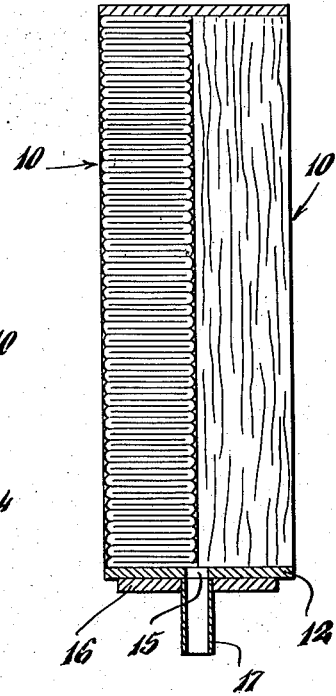
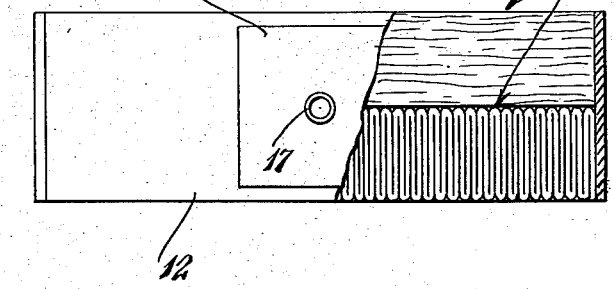
INVENTOR.
Julius P. Kovacs
BY
Kenyon & Kenyon
ATTORNEYS.

Sept. 25, 1951  J. P. KOVACS  2,569,243
FILTER
Filed Dec. 15, 1945  2 Sheets-Sheet 2
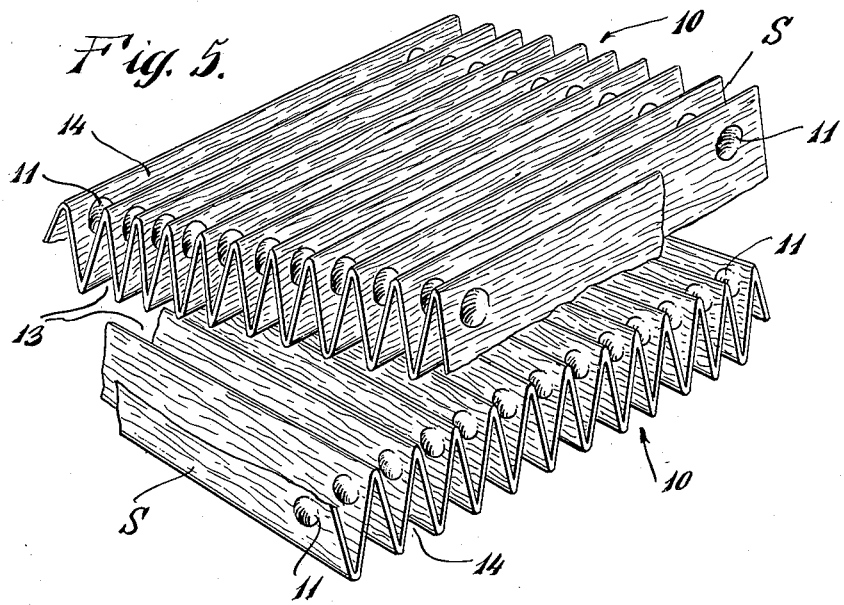
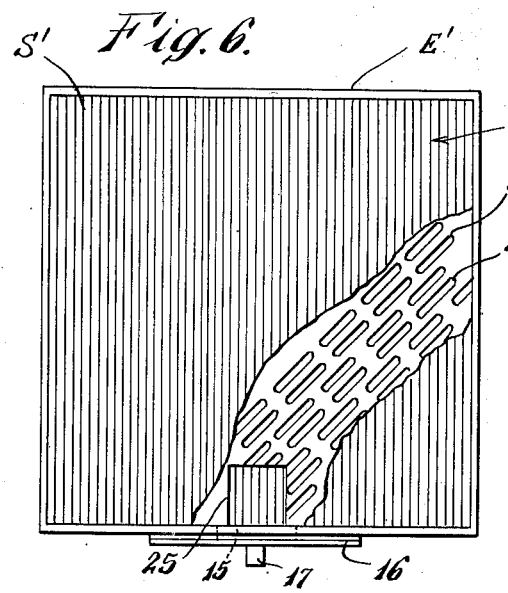
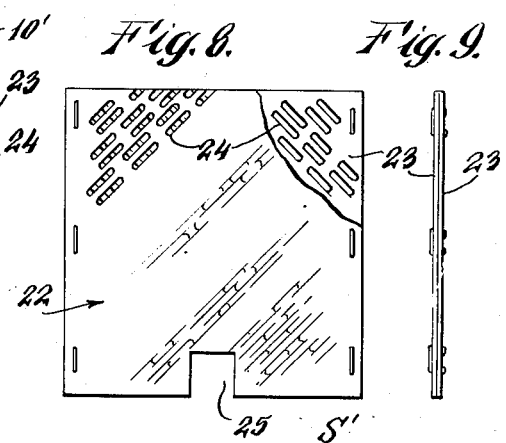
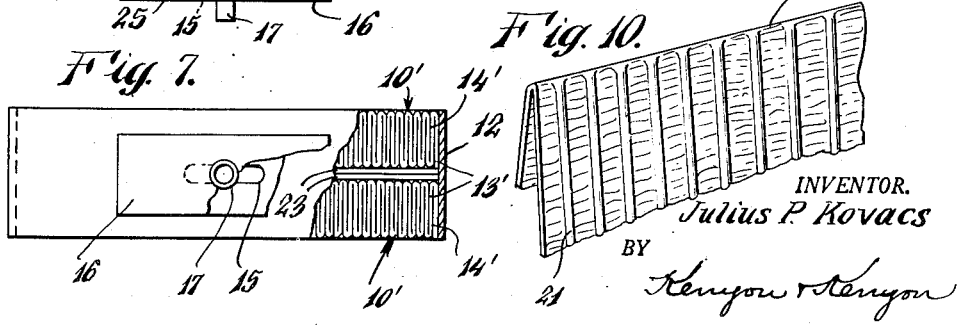
INVENTOR.
Julius P. Kovacs
BY
Kenyon & Kenyon
ATTORNEYS.

Patented Sept. 25, 1951

2,569,243

UNITED STATES PATENT OFFICE 2,569,243

FILTER

Julius P. Kovacs, Newark, N. J., assignor to Purolator Products, Inc., Newark, N. J., a corporation of Delaware Application December 15, 1945, Serial No. 635,287

6 Claims. (Cl. 210—169)

1

This invention relates to filters.

With the advent of engines of increasingly larger power capacities and consequent physical size, it has been found that space within the engine housing is at a premium. Consequently, cylindrical engine lubricant filters of the proper capacity known to those skilled in the art are unsuitable because of their large diameter. An object of this invention is a large area compact filter element of such shape that it can be accommodated in a casing suitable for introduction into a narrow space.

Other objects, novel features and advantages of this invention will become apparent from the following specification and accompanying drawings, wherein:

Fig. 1 is a section through a filter equipped with a filtering element embodying the invention;

Fig. 2 is a plan view partially broken away of the filter element of Fig. 1;

Fig. 3 is a section on the line 3—3 of Fig. 2;

Fig. 4 is an elevation of Fig. 2 broken away substantially on the line 4—4 of Fig. 2;

Fig. 5 is an enlarged perspective view of the filtering element in an intermediate stage of fabrication;

Fig. 6 is a plan view of a modified filtering element;

Fig. 7 is an elevation of Fig. 6;

Fig. 8 is a plan view of a portion of the filtering element of Fig. 6;

Fig. 9 is an edge view of Fig. 8, and

Fig. 10 is a fragmentary view generally similar to Fig. 5 illustrating a structural difference between the two filtering elements.

In Figs. 1 to 5 inclusive, the filtering element E consists essentially of two units 10, each composed of a strip S of filtering material pleated or folded as shown in Fig. 5 and the successive pleats of each strip are formed with offsets 11. The two units 10 are arranged in a rectangular enclosing frame 12 of such dimensions that the offsets 11 of successive pleats of each strip S interengage and the spacing between successive pleats is determined by the height of the offsets. The arrangements of the units 10 within the frame is such that the inner or facing folds of the pleats of one unit extend at right angles to and in contact with the inner or facing folds of the pleats of the remaining unit, it being observed that the inner or facing folds of the pleats of the two units lie substantially parallel with a common plane in crossed relationship. The edges of each strip S are attached to the walls of the frame 12 by suitable adhesive, thereby forming two sets of oppositely facing pockets 13

2 and 14 and the end pleats of each strip S also are attached by suitable adhesive to the walls of the frame 12. The pockets 13 of each unit 10 face inwardly toward the pockets 13 of the other unit while the pockets 14 of each unit face outwardly away from the pockets 14 of the other unit.

A slot 15 is provided in one wall of the frame 12 in alinement with the facing folds of the pleats of the units 10. A reinforcing and retaining plate 16 carries a drainage tube 17 and is attached to said one wall of the frame with the tube communicating with the slot 15.

Preferably, each unit 10 consists of a strip of filter paper or other suitable filtering medium impregnated during its manufacture with a suitable resin having irreversible thermoplastic characteristics, the resin not being heat-treated and the impregnated strip being sufficiently pliable for working into the desired shape. The strip is suitably worked to form therein the pleats and the offsets (Fig. 5), after which it is gathered to locate the offsets 11 in contact and introduced into the frame 12. The frame 12 and also the plate 16 preferably are composed of stiff material such as cardboard of no greater liquid permeability than the material of the unit 10 and also impregnated during production with a suitable resin having irreversible thermoplastic characteristics, the resin not being heat-treated. After assembly of the two units 10 in the frame 12 with the plate 16 and drainage tube 17 attached thereto, the assembled filtering element is subjected to sufficient heat to set the resin and give the element the requisite rigidity to withstand the pressures to which it will be subjected under normal operating conditions.

The filtering element is arranged in a suitable narrow casing 18 having a fluid inlet 19 and a fluid outlet 20 communicating with the drainage tube 17. In operation, fluid under pressure is supplied to the casing 18. The fluid enters the outwardly facing pockets 14 and passes into the inwardly facing pockets 13 through the filtering material by which impurities are removed. From the inwardly facing pockets, the filtered fluid flows through the drainage tube 17 into the discharge pipe 20 by which it is conducted to a suitable receiver. By-pass of fluid around the edges of the filtering strips S is prevented by the adhesive between the filtering material edges and the inner surfaces of the frame 12.

In the modified embodiment of Figs. 6 to 10, each filtering unit 10' of the elements E' consists of a strip S' of filtering material having transversely extending corrugations 21 formed in each pleat, thereby resulting in a structure of a channeled appearance when the pleats are pressed together. Each channel formed by adjacent corrugations 21 extends the full depth of the pocket 13' or 14' between adjacent pleats. The pockets of each unit are parallel to the pockets of the other unit and a drainage member 22 is arranged between and engaged by the facing folds of the pleats of the two strips with said facing folds lying substantially parallel with a common plane of the drainage member 22. This drainage member is composed of two rectangular plates 23 each having a series of rows of elongated slots 24 parallel to a diagonal, the slots in one plate being at right angles to the slots in the other plate. Each plate is cut out as at 25 along one edge with the two cut-out portions being in register. The arrangement of the slots is such that liquid contained in any one of them may flow by way of other slots in both plates to reach the cut-out portion.

I claim:

1. A disposable filtering element for removable insertion into a filter casing comprising a pair of adjacent units parallelly disposed relative to each other, a common frame extending around the peripheries of both said units and acting as a common support for both of said units, each unit consisting of a pleated strip of filtering material, means for providing spacing between adjacent walls of pleats of each strip, said pleated strips being carried in said frame so that edges of the strip of each unit engage opposite internal faces of said frame and in cooperation with said means form inwardly and outwardly facing pockets in each unit defined by walls of the pleats of that unit and the said opposite internal faces of said frame, the inwardly facing pockets of said two units lying adjacent each other with facing folds of the pleats of the two units lying substantially parallel with a common plane, and a drainage tube carried in one wall of said common frame substantially in alinement with the facing folds of the pleats and communicating with the said inwardly facing pockets of said units, said two units, said common frame and said drainage tube constituting said disposable filter element which is removably insertable into said filter casing.

2. A disposable filtering element for removable insertion into a filter casing comprising two parallel adjacent units, a common frame extending around the peripheries of both said units and acting as a common support for both of said units, each unit consisting of a gathered pleated strip of filtering material, means for providing spacing between adjacent walls of pleats of each strip, said pleated strips being carried in said frame so that edges of the strip of each unit engage opposite internal faces of said frame, said edges being adhered to the said internal faces and in cooperation with said means form inwardly and outwardly facing pockets in each unit defined by walls of the pleats of that unit and said opposite internal faces of said frame, the inwardly facing pockets of said two units lying adjacent each other with facing folds of the pleats of the two units lying substantially parallel with a common plane, said frame having an opening in one wall communicating with the inwardly facing pockets of the gathered pleated strips of said two units, a reinforcing plate secured to said frame over said opening, and a drainage tube carried by said plate substantially in alinement with the facing folds of said pleats and in communication with said opening and thereby in communication with said inwardly facing pockets of said two units, said two units, said common frame, said plate and said drainage tube constituting said disposable filter element which is removably insertable into said filter casing.

3. A filtering element comprising two parallel adjacent units each consisting of a pleated strip of filtering material having corrugations in each pleat, a frame enclosing both said units and engaging the strip edges thereof to form oppositely facing pockets, a drainage tube in one wall of said frame and a spacing member between said units, said spacing member consisting of two plates having registering cut-out portions in one edge communicating with said drainage tube, and a plurality of rows of diagonally arranged slots in each plate with the slots of one plate extending substantially at right angles to the slots of the other plate, the facing folds of the pleats of the two units being substantially parallel with a common plane.

4. A disposable filtering element for removable insertion into a filter casing comprising a pair of parallelepiped-shaped units parallelly disposed relative to each other, a rectangular frame extending around like peripheries of both said units and acting as a common support for both of said units, each unit consisting of a gathered pleated strip of filtering material, means for providing spacing between adjacent walls of pleats of each strip, said pleated strips being carried in said frame so that the edges of the strip of each unit engage opposite internal faces of said frame and in cooperation with said means form inwardly and outwardly facing pockets in each unit defined by the pleats in the strip of that unit and the said opposite internal faces of said frame, the facing folds of pleats of the two units lying substantially parallel with a common plane extending transversely between the inwardly facing pockets of the units, and a drainage tube carried in one wall of said frame substantially in alinement with the common plane and communicating with the inwardly facing pockets of the two units, said two units, said common frame and said drainage tube constituting said disposable filter element which is removably insertable into said filter casing.

5. A device as per claim 4 in which the pleats in the strips of filtering material in the two units extend parallelly and in which the strip of filtering material of each unit has corrugations formed therein extending the full depths of the pockets formed by its pleats.

6. A filtering element comprising two parallel adjacent units each consisting of a pleated strip of filtering material having corrugations extending transversely in each pleat, a frame enclosing both said units and engaging the strip edges thereof to form oppositely facing pockets with facing folds of the pleats of each unit substantially parallel with a common plane, a drainage tube in one wall of said frame, and a spacing member between said units, said spacing member consisting of two plates having registering cut-out portions in one edge communicating with said drainage tube, and a plurality of rows of diagonally arranged slots in each plate with the slots of one plate extending substantially at right angles to the slots of the other plate.

JULIUS P. KOVACS.

(References on following page)

REFERENCES CITED

The following references are of record in the file of this patent:

UNITED STATES PATENTS

| Number | Name | Date |
|---|---|---|
| 813,327 | Schirmer | Feb. 20, 1906 |
| 1,147,279 | Sweetland | July 20, 1915 |
| 1,790,036 | Wiltse | Jan. 27, 1931 |
| 1,867,397 | Brace et al. | July 12, 1932 |
| 2,008,560 | Nutting | July 16, 1935 |
| 2,278,603 | Williams | Apr. 7, 1942 |
| 2,279,423 | Vokes | Apr. 14, 1942 |
| 2,337,574 | Sloan et al. | Dec. 28, 1943 |
| 2,372,865 | Taylor | Apr. 3, 1945 |
| 2,410,371 | Vokes | Oct. 29, 1946 |

FOREIGN PATENTS

| Number | Country | Date |
|---|---|---|
| 2,022 | Switzerland | Jan. 23, 1890 |
| 72,754 | Germany | Aug. 31, 1892 |
| 303,773 | Germany | Feb. 15, 1918 |
| 497,204 | Great Britain | Dec. 14, 1938 |
| 803,101 | France | Sept. 23, 1936 |